United States Patent
Vlach et al.

(10) Patent No.: US 6,797,203 B2
(45) Date of Patent: Sep. 28, 2004

(54) METHOD OF FORMING CERAMIC BEADS

(75) Inventors: Thomas J. Vlach, Eastlake, OH (US); Viktor Yaroshenko, Seven Hills, OH (US); Vijay V. Pujar, Strongsville, OH (US)

(73) Assignee: CerCo LLC, Cleveland, OH (US)

( * ) Notice: Subject to any disclaimer, the term of this patent is extended or adjusted under 35 U.S.C. 154(b) by 0 days.

(21) Appl. No.: 10/194,932

(22) Filed: Jul. 12, 2002

(65) Prior Publication Data

US 2004/0007789 A1 Jan. 15, 2004

(51) Int. Cl.$^7$ ................................................. B29B 9/00
(52) U.S. Cl. ............................ 264/8; 264/14; 264/621
(58) Field of Search ................................ 264/8, 14, 621

(56) References Cited

U.S. PATENT DOCUMENTS

| | | | |
|---|---|---|---|
| 3,331,898 A | | 7/1967 | Haas et al. |
| 3,457,335 A | | 7/1969 | Elliott |
| 4,318,896 A | | 3/1982 | Schoonover |
| 4,621,936 A | | 11/1986 | Hansson et al. |
| 4,628,040 A | | 12/1986 | Green et al. |
| 5,312,571 A | * | 5/1994 | Pujari et al. .................. 264/13 |
| 5,484,559 A | | 1/1996 | Johns |
| 6,197,073 B1 | * | 3/2001 | Kadner et al. ............ 23/305 A |
| 6,309,749 B1 | | 10/2001 | Chatterjee et al. |
| 6,495,257 B1 | * | 12/2002 | Terase et al. ............... 428/404 |

* cited by examiner

Primary Examiner—Christopher A. Fiorilla
(74) Attorney, Agent, or Firm—Rankin, Hill, Porter & Clark LLP

(57) ABSTRACT

A method of forming substantially spherical ceramic beads that includes conveying an aqueous ceramic slurry to a nozzle tip that is immersed in an inert water-immiscible fluid layer. The nozzle tip is spaced a predetermined distance away from a rotating disk that is also immersed in the immiscible fluid layer. The rotating disk creates a shear force that at the nozzle tip that dislodges droplets of the aqueous ceramic slurry from the nozzle tip into the immiscible fluid layer. Once dislodged, the droplets assume a substantially spherical shape and a substantially mono-modal size distribution. The droplets are permitted to pass from the immiscible fluid layer into an aqueous gelling solution wherein the droplets are converted into rigid beads. In a preferred embodiment of the invention, the rigid beads are recovered from the gelling solution, washed, and then sintered to obtain a density of greater than about 98% of theoretical density and a sphericity of greater than about 0.95. The method can be used to fabricate substantially spherical zirconia-containing beads having a diameter within the range of from about 0.1 mm to about 2.0 mm that are useful, for example, as grinding media.

13 Claims, 2 Drawing Sheets

METHOD OF FORMING CERAMIC BEADS

FIELD OF INVENTION

The present invention provides a method of forming substantially spherical ceramic beads.

BACKGROUND OF THE INVENTION

Ceramic beads are useful in a number of applications including, for example, as grinding media, catalyst supports, adsorbent materials, and pen balls. There are a number of known methods of forming ceramic beads, with the "spray dry" and "oil-drop" methods being most widely used. In both of these methods, an aqueous ceramic bead forming liquid is dispensed into droplets which are then hardened. In the "spray dry" method, all or part of the hardening takes place in a stream of air. In the "oil-drop" method, at least a portion of the hardening occurs while the droplets are dispersed in a water-immiscible liquid, such as mineral oil. In some cases, the ceramic beads are formed using a combination of the various aspects of the "spray dry" and "oil drop" methods. Representative examples of prior art methods of forming ceramic beads are disclosed in: Elliott, U.S. Pat. No. 3,457,335; Schoonover, U.S. Pat. No. 4,318,896; Hansson et al., U.S. Pat. No. 4,621,936; Green et al., U.S. Pat. No. 4,628,040; and Johns, U.S. Pat. No. 5,484,559.

The limitations and drawbacks associated with prior art methods of forming ceramic beads are well known. One of the most significant drawbacks is the difficulty in obtaining ceramic beads having a substantially mono-modal size distribution in the absence of substantial post-bead formation processing. Many of the prior art methods of forming ceramic beads produce beads having a relatively broad distribution of bead sizes. This results in requirement for additional processing, such as classification, in order to obtain beads having only the desired size. It also results in waste.

Another limitation of prior art methods of forming ceramic beads is that the beads themselves tend not to be substantially spherical. In prior art methods, it is not uncommon to obtain a substantial number of beads that have a shape similar to a teardrop or the candy sold by the Hershey Foods Corporation as HERSHEY'S KISSES. Uniform sphericity is highly desired but difficult to obtain using prior art methods. Other limitations of prior art methods include, for example, difficulties in controlling the size of the beads formed, the materials that can be used, and the production rate.

A method is needed that can be used to form spherical ceramic beads that overcome the limitations of the prior art. Such a method should be able to produce ceramic beads having a substantially mono-modal size distribution without significant post-bead formation processing. Moreover, the beads should substantially spherical. Furthermore, the method should be suited to making beads over relatively a wide range of diameters, including beads that are less than 1 mm in diameter. Furthermore, the method should be able to produce ceramic beads having a variety of compositions at a high production rate.

SUMMARY OF INVENTION

The present invention provides a method of forming substantially spherical ceramic beads. The method comprises conveying an aqueous ceramic slurry to a nozzle tip that is immersed in an inert water-immiscible fluid layer, wherein the nozzle tip is spaced a predetermined distance away from a rotating disk that is also immersed in the immiscible fluid layer. The rotation of the disk in the immiscible fluid creates a shear force at the nozzle tip that dislodges droplets of the aqueous ceramic slurry from the nozzle tip into the immiscible fluid layer. Once dislodged, the droplets assume a substantially spherical shape. The droplets are permitted to pass from the immiscible fluid layer into an aqueous gelling solution wherein the droplets are converted into rigid beads. In a preferred embodiment of the invention, the rigid beads are recovered from the gelling solution, washed, and then sintered to obtain a density of greater than about 98% of theoretical density and a sphericity of greater than about 0.95. Surprisingly, the droplets produced according to the method exhibit a substantially mono-modal size distribution.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The present invention provides a method of forming substantially spherical ceramic beads. The method comprises dispensing controlled amounts of an aqueous ceramic slurry through a nozzle tip. The nozzle tip is spaced a predetermined distance away from a rotating disk. Both the nozzle tip and the rotating disk are immersed in an inert water-immiscible fluid layer. Preferably, the immiscible fluid layer is less dense than water and thus is capable of being floated on an aqueous gelling solution. When the disk is rotated at a predetermined speed in the immiscible fluid, it subjects the ceramic slurry being dispensed through the nozzle tip to a shear force that dislodges the ceramic slurry in the form of fine droplets of nearly uniform size. The size of the droplets dislodged from the nozzle tip is significantly smaller than if no shear force was present. Gravity causes the droplets to pass from the immiscible fluid layer into the aqueous gelling solution wherein the droplets are converted into substantially spherical rigid beads. The size and sphericity of the beads can be controlled by regulating the flow rate of the slurry from the nozzle tip, the nozzle tip diameter, the distance of the nozzle tip from the rotating disk, the speed and size of the disk, the height of the immiscible fluid above the aqueous gelling solution, the concentration of the gelling solution, and the physical properties (e.g., viscosity) of the immiscible fluid.

Figure 1:
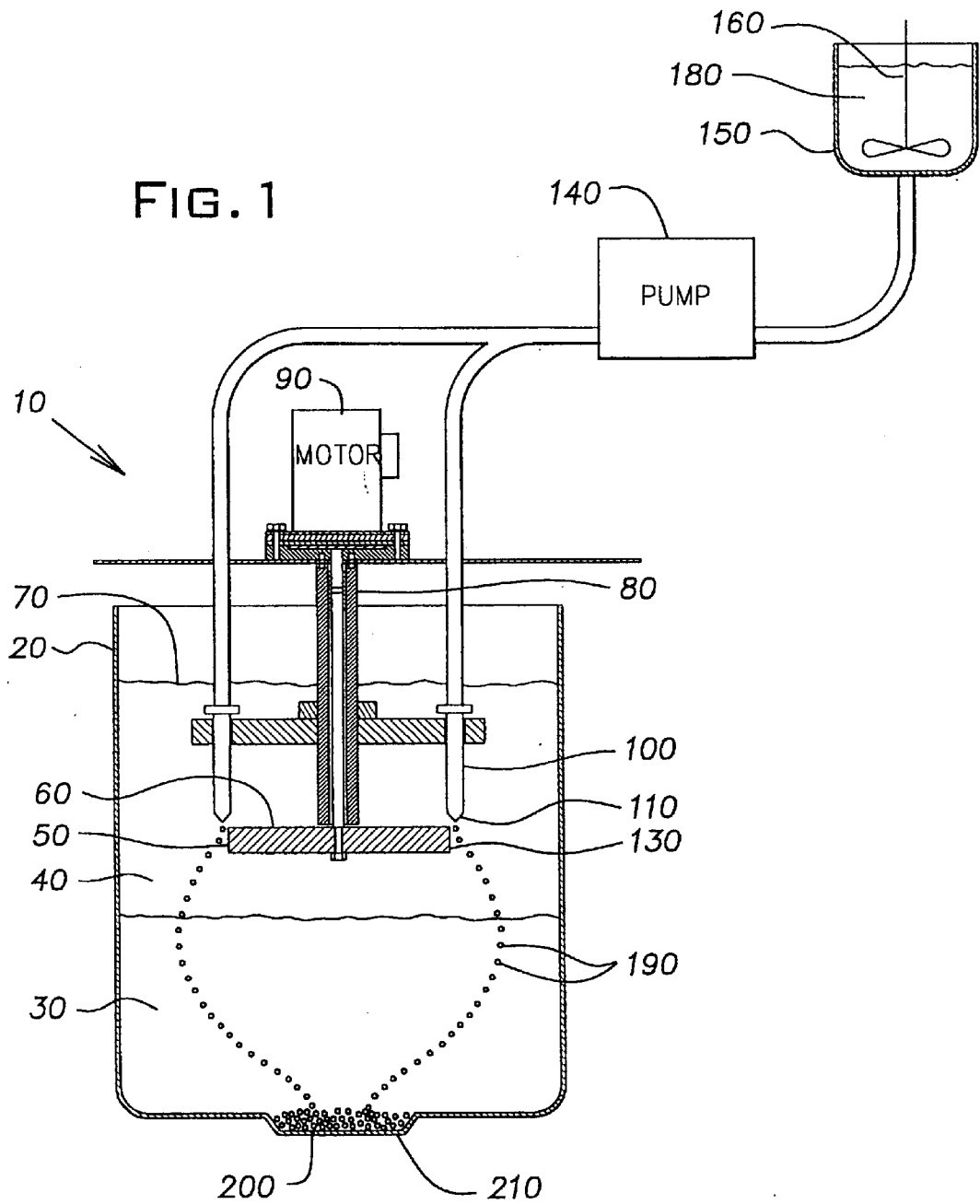
FIG. 1 is a schematic diagram of the apparatus used in the method of the present invention.

FIG. 1 shows a schematic diagram of an apparatus used in the method of the present invention. The apparatus 10 comprises a tank 20. The tank 20 is preferably cylindrical to minimize the possibility of splashing, but non-cylindrical tanks can be used. The tank 20 is partially filled with an aqueous gelling solution 30. An inert water-immiscible layer 40 is then carefully poured into the tank 20 to create a layer above the aqueous gelling solution 30.

A circular disk 50 is immersed in the immiscible layer 40 such that the flat upper surface 60 of the disk 50 is substantially parallel the surface 70 of the immiscible layer 40. The disk 50 has a axially mounted drive shaft 80 that extends out of the immiscible layer 40 to a variable speed motor 90.

Figure 2:
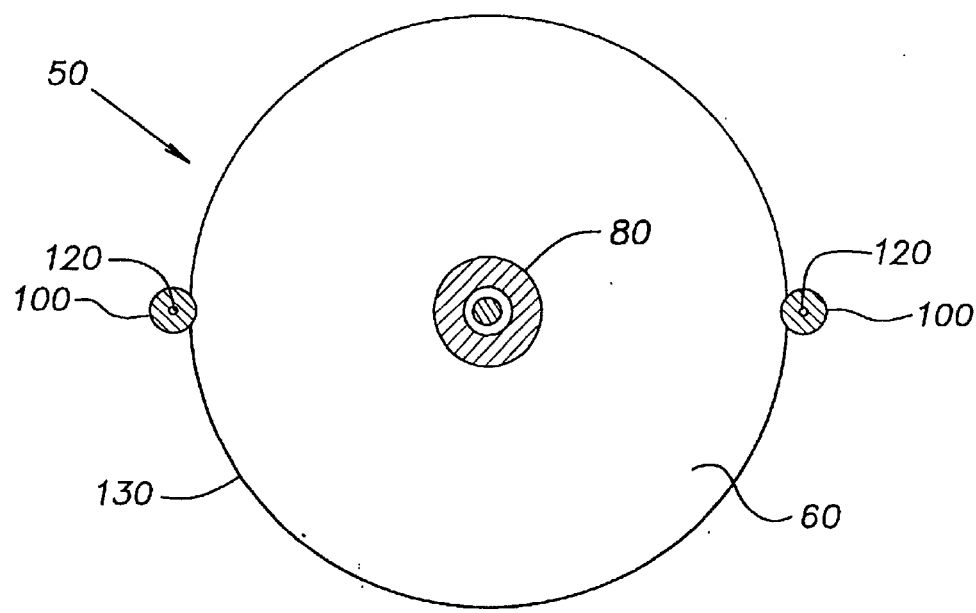
FIG. 2 is a top plan view of a portion of the apparatus shown in FIG. 1.

One or more nozzles 100 having tips 110 with orifices 120 (two such nozzle assemblies are shown in FIG. 2) are immersed into the immiscible layer 40. The tip 110 of each nozzle 100 is positioned so as to be a predetermined distance away from the outer edge 130 of the disk 50. The nozzle 100 is in fluid connection with a metering pump 140 and a container 150 including a stirrer 160.

FIG. 2 is a top plan view of a portion of the apparatus 10 shown in FIG. 1. FIG. 2 shows the disk 50, including the flat upper surface 60 and outer edge 130, and the drive shaft 80. FIG. 2 also shows the nozzle 100, including the orifice 120. The disk 50 is preferably formed from an inert, rigid material such as, for example, stainless steel, polytetrafluoroethylene (PTFE), or ceramic, that is insoluble in the immiscible fluid.

Figure 3:
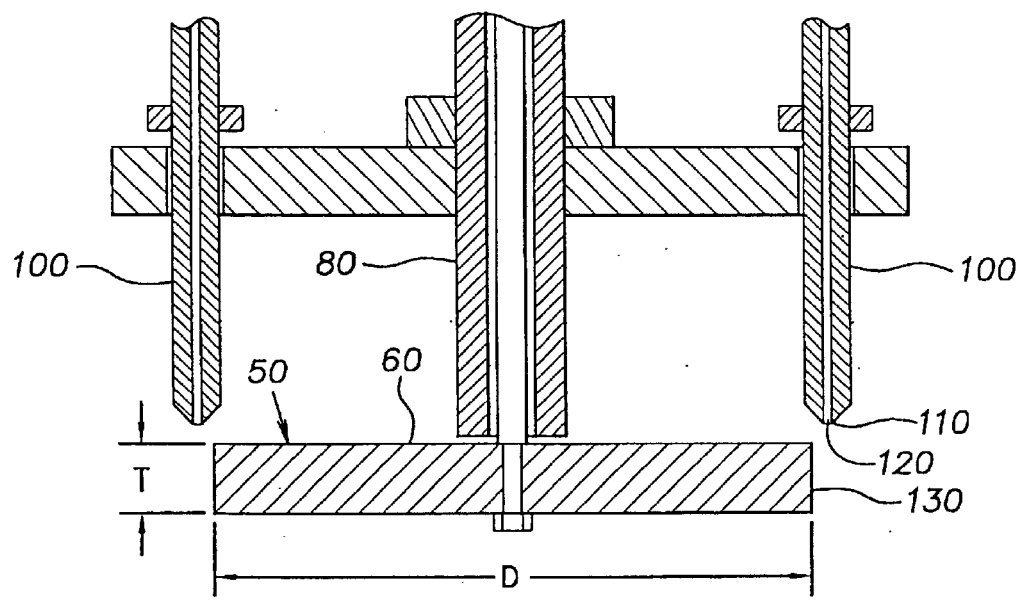
FIG. 3 is a side sectional view of a portion of the apparatus shown in FIG. 1 taken along the line A—A in FIG. 2.

FIG. 3 is a side sectional view of a portion of the apparatus 10 taken along the line A—A in FIG. 2. FIG. 3 shows the disk 50, including the flat upper surface 60 and outer edge 130, and the drive shaft 80. FIG. 3 also shows the nozzle 100, including the tip 110 and orifice 120. The diameter D and the thickness T of the disk 50 have a significant affect on the shear force created at the tip 110 of the nozzle 100. Those of skill in the art will appreciate that the shear force created at the tip 110 of the nozzle 100 will also be affected by the rotational speed of the disk 50, the viscosity of the immiscible layer 40, and the position of the tip 110 of the nozzle 100 in relation to the disk 50.

With reference to FIG. 1, an aqueous ceramic slurry 180 is pumped from the container 150 to the nozzle 100 at a constant rate using the metering pump 140. The rotation of the disk 50 in the immiscible layer 40 creates a shear force that dislodges fine droplets 190 of the slurry 180 from the nozzle tip 110 into the immiscible layer 40. The droplets 190 assume a spherical shape as they sink through the immiscible layer 40. Gravity conveys the droplets 190 into the aqueous gelling solution 30 wherein the droplets 190 are converted to rigid beads 200. The beads 200 can be collected and removed from the tank 20 using a trap 210 situated at the bottom of the tank 20.

Applicants have found that the preparation of the slurry is important to reduce flaws in the final product. The slurry must be extremely well dispersed and 95% or more by volume of the solids must have a particle size of less than 5 microns. Commercially available high-energy stirred media mills may be used to produce slurries for use in the present method.

In a preferred embodiment, the method of the present invention further comprises washing the beads for several minutes in running distilled water in order to remove any gelling solution residue. The beads can then be dried and fired at high temperatures, typically between 1400° C. and 1600° C., for about 1 to about 5 hours. After sintering, the beads will generally exhibit a density that is greater than about 95% of theoretical density, or more preferably greater than about 98% of theoretical density. In the most preferred embodiment of the invention, the beads have a density that is greater than 99.5% of theoretical density.

Ceramic beads formed according to the method of the present invention are substantially spherical. For example, the sphericity of the beads produced according to the method is typically greater than 0.95 (minor vs. major axis size). Beads having a sphericity of 0.98 or greater are obtainable.

Ceramic beads formed according to the method of the present invention tend to have a mono-modal size distribution. In other words, prior to any post-formation processing about 85% of the beads will all be about the same size within a very narrow range, typically ±20% in diameter. By varying the process variables discussed above (flow rate, nozzle size, disk speed, disk size and thickness), it is possible to obtain ceramic beads that are as small as 0.1 mm in diameter or less, and beads as large as 6.0 mm in diameter or more. The method is particularly suitable for the production of ceramic beads having a diameter of less than about 1.0 mm, which are desired for many applications.

The aqueous ceramic slurry used in the method of the present invention preferably comprises one or more ceramic powders dispersed in an aqueous alginate solution such as, for example, ammonium alginate, sodium alginate, and/or calcium alginate. Preferably, the alginate solution should be permitted to hydrate for a period of from about 6 hours to about 96 hours before it is mixed with other components comprising the slurry. It will be appreciated that the chemical composition of the aqueous ceramic slurry is not per se critical.

The ceramic powders used in the slurry are typically zirconia, zirconium silicates, aluminates, titanates, borates, and silicates, which may or may not be stabilized using yttria, ceria or other stabilizing materials known in the art. The ceramic powders may also include one or more sintering aids-such as one or more glass frits (e.g., cordierite based glass frits) and/or kaolin-talc-alumina based systems. The ceramic powders preferably have a small particle size to allow for the formation of small droplets. Particle sizes on the order of 1 $\mu$m or less are generally preferred. Dispersants can be used to assist in dispersing the ceramic powders in the slurry.

In the presently preferred embodiment of the invention, the aqueous ceramic slurry comprises a ceramic powder dispersed in an aqueous ammonium alginate solution. Preferably, the ceramic powder comprises a mixture of zircon powder, one or more glass frits and optionally colloidal silica so as to provide a sintered composition comprising, by weight, about 87.3% zirconia, about 8.0% silica, about 3.5% alumina, about 0.7% magnesia, and about 0.5% calcia. In such a formulation, the total glass content will typically be about 12.7% by weight, which corresponds to about 30–35% by volume.

The slurry will preferably have a viscosity of from about 5 to about 30 seconds (measured with a #5 Zahn cup) and a solids content of from about 10% to about 40% by volume. It has been determined that use of low molecular weight alginate solutions will tend to yield lower viscosity slurries that are easier to work with. It has also been determined that use of low molecular weight sodium alginate is not as effective as low molecular weight ammonium alginate because low molecular weight sodium alginate tends to produce a foamy slip that must be de-aired in order to prevent the formation of hollows. Furthermore, sodium alginate can contribute small amounts of soda into the beads, which can cause wear problems in certain ceramic bead applications.

The slurry is preferably milled using a high-energy stirred mill prior to use. Applicants have determined that this type of milling leads to beads having a higher densification upon sintering than if the slurry is simply ball milled.

The immiscible layer preferably comprises an inert, water-immiscible fluid having a viscosity which is lower than the viscosity and density of the slurry. Examples of suitable immiscible fluids include petroleum solvents such as mineral spirits, butyl stearate, glycols, acetates and low solubility alcohols. Mineral spirits are presently most preferred for use in the method of the invention because of its high flash point. The viscosity and depth of the immiscible layer can affect the sphericity of the beads and the rate at which the beads can be produced. Too small of a layer can lead to pregelation of the slurry material.

The aqueous gelling solution preferably comprises an aqueous solution of calcium chloride. It will be appreciated that other soluble salts such as any polyvalent salt with an ionic radius greater than $Mg^{+2}$ can be used. The concentration of the calcium chloride can be within the range of from about 5% to about 25% by weight in water, which is preferably distilled. The gelling solution causes the solid ceramic particles in the slurry to dehydrate and form a gel, thus giving the bead a rigid form.

The following examples are intended only to illustrate the invention and should not be construed as imposing limitations upon the claims.

EXAMPLE I

An alginate solution was prepared by mixing 3 g. ammonium alginate powder with 97 g. distilled water in a high shear mixer. The alginate solution was allowed to hydrate for 24 hours. A slurry was prepared by mixing:

(i) 100 g. of the alginate solution;
(ii) 300 g. of a ceramic powder consisting of 93% by weight zircon powder (1 μm average) and 7% by weight of a cordierite-based glass powder sold by Ferro Corporation under the trade designation 3851 (relative composition ±3% by weight: CaO 0.5%; MgO 23.8%; $Al_2O_3$ 26.8%; and $SiO_2$ 48.9%);
(iii) 30 g. distilled water; and
(iv) 3 g. of a dispersant available from R. T. Vanderbilt as DARVAN 821-A.

The slurry was milled in an Attritor mill for 1 hour using 1650 g. of 3 mm yttria stabilized zirconia media.

A large cylindrical tank approximately 150 cm tall and 30 cm in diameter was filled to a height of about 70 cm with a solution consisting of 20% by weight calcium chloride dissolved in distilled water. A layer of mineral spirits was then carefully poured into the tank so as to create a layer above the calcium chloride solution approximately 50 cm thick.

A circular stainless steel disk was immersed into the mineral spirits such that the flat upper surface of the disk was substantially parallel to and approximately 12 cm below the top surface of the mineral spirits. The disk had a axially mounted drive shaft that extended out of the mineral spirits to a variable speed motor. The diameter of the disk was 7 cm and the thickness of the disk was 0.50 cm.

A nozzle having a tip with an orifice diameter of 86μ microns was immersed into the mineral spirits and positioned so that the tip of the orifice was approximately 3 mm above and away from the outer edge of the disk. The nozzle was in fluid connection with a metering pump and a stirred container containing the slurry.

The motor was adjusted to rotate the disk at 250 rpm. The metering pump was adjusted to pump the slurry through the orifice in the nozzle tip at a constant rate of 10 ml/min. The rotation of the disk in the mineral spirits created a shear force that dislodged fine droplets of the slurry from the nozzle tip into the layer of mineral spirits. The fine droplets assumed a spherical shape as they sank through the layer of mineral spirits. Gravity conveyed the fine droplets into the calcium chloride solution wherein the fine droplets were converted to rigid beads.

The rigid beads were collected using a trap situated at the bottom of the tank. The beads were washed for several minutes in running distilled water in order to remove any chloride residue. The beads were then dried in an oven at 160° C. for 12 hours. The dried beads were then fired in a high temperature alumina sagger at 1525° C. for 1 hour.

After cooling, the beads were analyzed. 90% of the beads produced exhibited a nearly uniform mono-modal size distribution with an average size of around 0.8 mm. The beads had a density that was greater than 98% of theoretical density. The sphericty of the beads, which was determined using well known microscopic means, was over 0.95.

EXAMPLE II

An alginate solution was prepared by mixing 2 g. ammonium alginate powder with 64 g. distilled water in a high shear mixer. The alginate solution was allowed to hydrate for 24 hours. A slurry was prepared by mixing:

(i) 66 g. of the alginate solution;
(ii) 275 g. of a ceramic powder consisting of 100% by weight commercial quality ceria stabilized tetragonal zirconia particulates (Ce-TZP) having an average particle size of 0.5 μm;
(iii) 50 g. distilled water; and
(iv) 2.5 g. of a dispersant available from Zschimmer und Schwarz GmbH & Co. Chemische Fabriken, Lahnstein, Germany as DOLAPIX PC33.

The slurry was milled in an Attritor mill for 1 hour using 1650 g. of 3 mm yttria stabilized zirconia media.

The slurry was pumped into mineral spirits using the same apparatus and conditions as described in Example 1, except that the disk was rotated at 200 rpm and the flow rate of the slurry through the orifice in the nozzle tip was 8 ml/min. The rigid beads formed in the calcium chloride solution were washed and dried as described in Example 1 and then fired at 1500° C. for 0.5 hr. Analysis of the beads showed a nearly uniform mono-modal size distribution, with an average size of around 1.0 mm. The beads had a density that was greater than 99.5% of theoretical density. The sphericty of the beads was determined to be greater than 0.95.

EXAMPLE III

An alginate solution was prepared by mixing 3 g. ammonium alginate powder with 97 g. distilled water in a high shear mixer. The alginate solution was allowed to hydrate for 24 hours. A slurry was prepared by mixing:

(i) 100 g. of the alginate solution;
(ii) 300 g. of a ceramic powder consisting of 88% by weight zircon powder (1 μm average), 3% by weight of a glass frit sold by Ferro Corporation under the trade designation 3851, and 9% by weight colloidal silica sold by Nalco as AG1050;
(iii) 30 g. distilled water; and
(iv) 3 g. of a dispersant available from R. T. Vanderbilt as DARVAN 821-A.

The slurry was milled in an Attritor mill for 1 hour using 1650 g. of 3 mm yttria stabilized zirconia media.

The slurry was pumped into mineral spirits using the same apparatus and conditions as described in Example 1. The rigid beads formed in the calcium chloride solution were washed and dried as described in Example 1, and then fired in a high temperature alumina sagger at 1525° C. for 1 hour. After cooling, the beads were analyzed. 90% of the beads produced exhibited a nearly uniform mono-modal size distribution with an average size of around 0.8 mm. The beads had a density that was greater than 98% of theoretical density. The sphericty of the beads, which was determined using well known microscopic means, was over 0.95. The beads comprised about 88% by weight zircon, 10.5% by weight silica, about 0.8% by weight alumina, and about 0.7% by weight magnesia.

EXAMPLE IV

An alginate solution was prepared by mixing 3 g. ammonium alginate powder with 97 g. distilled water in a high shear mixer. The alginate solution was allowed to hydrate for 24 hours. A slurry was prepared by mixing:
  (i) 100 g. of the alginate solution;
  (ii) 300 g. of a ceramic powder consisting of 88% by weight zircon powder (1 μm average), 6% by weight of a ball clay sold under the trade designation as HUBER J2, 5% by weight colloidal silica sold by Nalco as AG1050, and 2% by weight talc;
  (iii) 30 g. distilled water; and
  (iv) 3 g. of a dispersant available from R. T. Vanderbilt as DARVAN 821-A.

The slurry was milled in an Attritor mill for 1 hour using 1650 g. of 3 mm yttria stabilized zirconia media.

The slurry was pumped into mineral spirits using the same apparatus and conditions as described in Example 1. The rigid beads formed in the calcium chloride solution were washed and dried as described in Example 1, and then fired in a high temperature alumina sagger at 1525° C. for 1 hour. After cooling, the beads were analyzed. 90% of the beads produced exhibited a nearly uniform mono-modal size distribution with an average size of around 0.8 mm. The beads had a density that was greater than 98% of theoretical density. The sphericty of the beads, which was determined using well known microscopic means, was over 0.95. The beads comprised about 87% by weight zircon, about 9% by weight silica, about 3.3% by weight alumina, and about 0.7% by weight magnesia. The beads also probably contained a small amount of CaO from calcium chlorate, but the amount was undetectable and was probably concentrated on the surface of the beads.

Additional advantages and modifications will readily occur to those skilled in the art. Therefore, the invention in its broader aspects is not limited to the specific details and illustrative example shown and described herein. Accordingly, various modification may be made without departing from the spirit or scope of the general invention concept as defined by the appended claims and their equivalents.

What is claimed:

1. A method of forming substantially spherical ceramic beads comprising:

conveying an aqueous ceramic slurry to a nozzle tip that is immersed in an inert water immiscible fluid layer, said nozzle tip being spaced a predetermined distance away from a rotating disk that is also immersed in said inert water immiscible fluid layer, said rotating disk creating a shear force at said nozzle tip;

dislodging droplets of said aqueous ceramic slurry from said nozzle tip into said immiscible fluid layer using said shear force, said droplets assuming a substantially spherical shape; and permitting said droplets to pass from said immiscible fluid layer into an aqueous gelling solution wherein said droplets are converted into rigid beads.

2. The method according to claim 1 further comprising:
   recovering said rigid beads from said gelling solution;
   washing said rigid beads; and
   sintering said rigid beads.

3. The method according to claim 2 wherein after sintering said rigid beads have a density of greater than about 98% of theoretical density.

4. The method according to claim 2 wherein after sintering said rigid beads have a sphericity of greater than about 0.95.

5. The method according to claim 2 wherein after sintering said rigid beads have a diameter of from about 0.1 mm to about 2.0 mm.

6. The method according to claim 5 wherein after sintering said rigid beads have a substantially mono-modal size distribution.

7. The method according to claim 1 wherein said inert water immiscible fluid layer comprises mineral spirits.

8. The method according to claim 1 wherein said aqueous gelling solution comprises an aqueous calcium chloride solution.

9. The method according to claim 1 wherein said aqueous ceramic slurry comprises a ceramic powder dispersed in an aqueous alginate solution.

10. The method according to claim 9 wherein said ceramic powder comprises zircon powder.

11. The method according to claim 10 wherein said ceramic powder further comprises a cordierite based glass powder.

12. The method according to claim 9 wherein said ceramic powder comprises ceria stabilized tetragonal zirconia particulate powder.

13. The method according to claim 9 wherein said aqueous ceramic slurry further comprises a dispersant.

* * * * *